Figure 1:
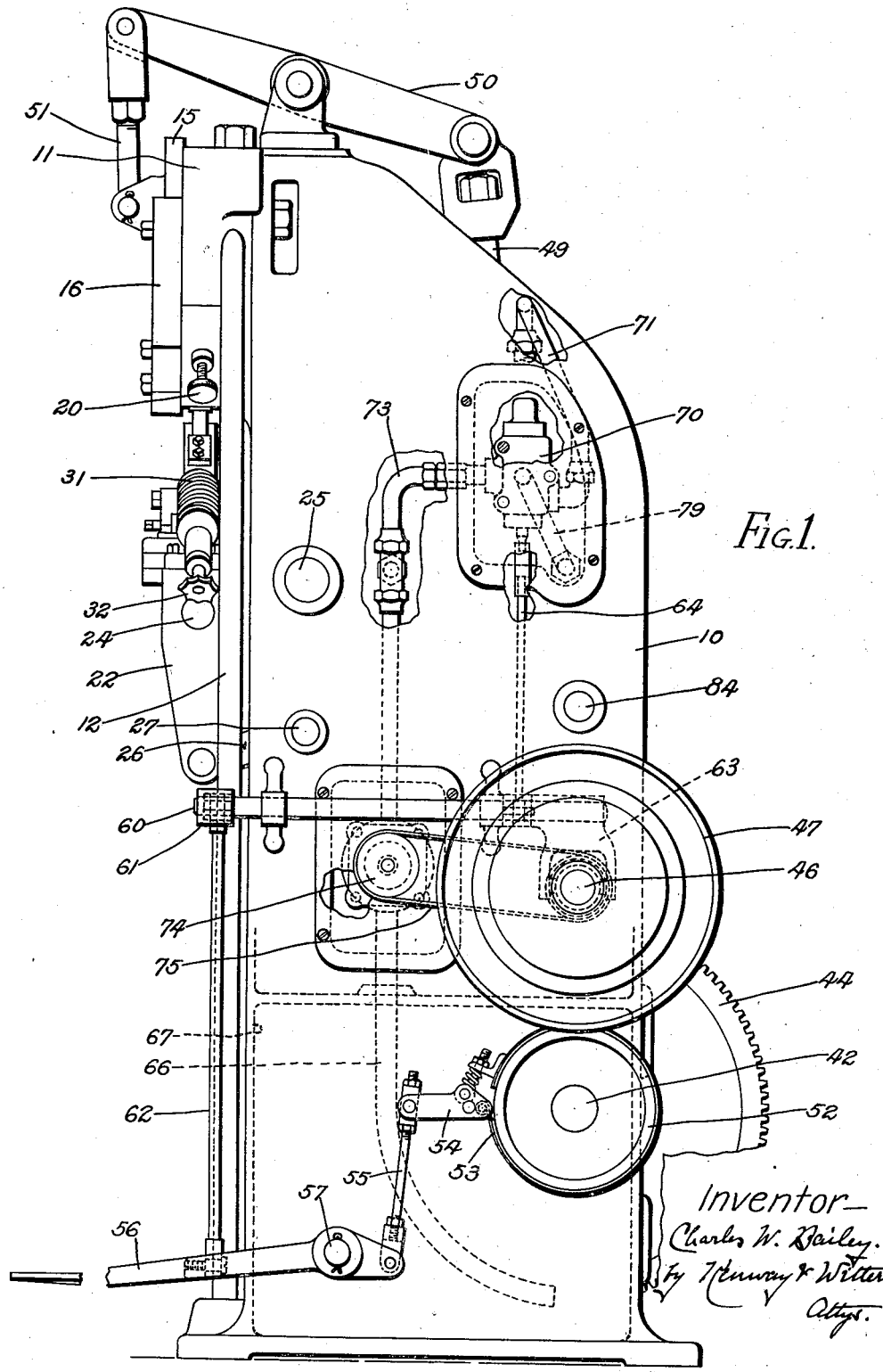

July 6, 1937.  C. W. BAILEY  2,085,731
COUNTER MOLDING MACHINE
Filed Aug. 3, 1936  5 Sheets-Sheet 5
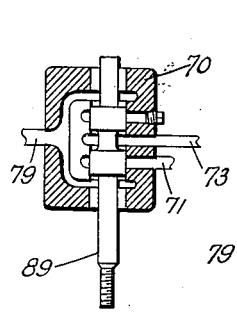
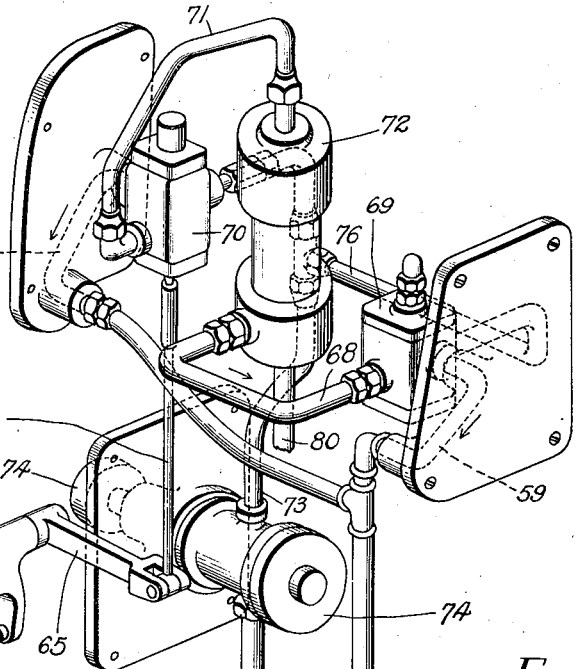
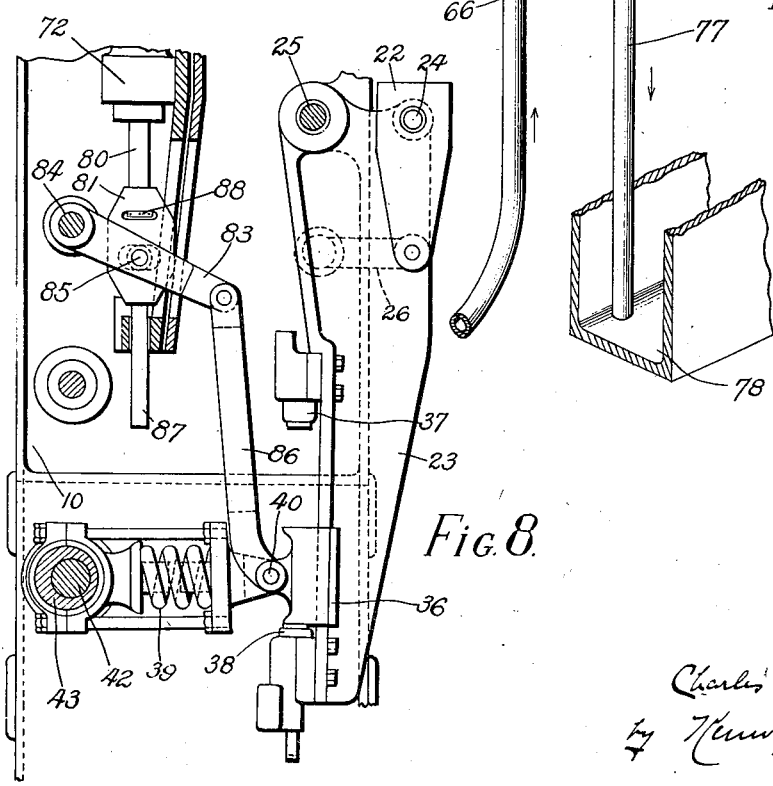
Inventor
Charles W. Bailey.
by Kenway & Witter
Attys.

Patented July 6, 1937

2,085,731

UNITED STATES PATENT OFFICE 2,085,731

COUNTER MOLDING MACHINE

Charles W. Bailey, Lynn, Mass., assignor to Stewart Bros., Lynn, Mass., a co-partnership composed of John Hammond Stewart and Roland A. Stewart Application August 3, 1936, Serial No. 93,977

19 Claims. (Cl. 12—66)

This invention relates to counter molding machines and consists in improvements in the mold actuating mechanism of such machines designed to increase their speed, efficiency and accuracy of operation and produce a quieter running and longer wearing machine than heretofore known.

In operating counter molding machines, it is the practice to close the cooperating molds upon the curved counter blank, first in a preliminary manner and then under a final heavy molding pressure. These machines are required to operate continuously day in and day out at relatively high speed and under very exacting pressure conditions. The problem of providing mechanism which will operate quietly and powerfully to give a quick mold movement in counter molding machinery is one which has for many years taxed the ingenuity of inventors and machine designers. The present invention, in one aspect, consists in a solution of this problem and involves novel features of construction useful in counter molding machines of all types.

In another aspect the invention consists in improvements in the well-known "Stewart counter molding machine" now in wide commercial use. In this type of machine the molding and releasing movement of the molds are effected by means of a power operated member, herein shown as a lever arranged to swing first to bring the molds into a position of preliminary pressure and then further in the same direction to cause the molds to apply the final molding pressure.

It is important in the rapid running of the machine by the operator to have the two movements of the power operated member under delicate and quickly responsive control and that the actual movement of the molds should take place promptly and without hesitation when the treadle or other controlling device is operated for initiating the various movements of the cycle. I have achieved these desirable results by incorporating in the machine a fluid pressure system which may be utilized for effecting the preliminary closing operation of the molds independently of the train of mechanism mechanically operated to impart the full molding pressure to the molds. An important feature of the present invention, therefore, consists in an organized counter molding machine having a fluid pressure system and a mechanically actuated train of mechanism in combination with a controlling device, all organized so that the preliminary closing movement of the molds may be effected by fluid pressure actuation and then, in the proper timed relation, the final molding movement effected by the operation of the mechanical train.

Preferably and as herein shown, the fluid pressure system includes a pump arranged to be driven by the main driving pulley of the machine, or by some other element which is in motion while the machine is being used, and serving to maintain a uniform and adequate degree of fluid pressure available in the system and capable of being rendered instantly effective by the manipulation of a light controlling device such as a treadle operated valve. An effective way of utilizing the fluid pressure system is by arranging it to control the point of connection between the power operated lever and the mechanical operating train. In the machine herein shown both the mechanically actuated train of mechanism and the fluid actuated train of mechanism are brought to a common point of connection with the power operated member, and the construction is such that this point of connection is first shifted by the actuation of the fluid operated mechanism both to effect the preliminary closing movement of the molds and to position the mechanical train for imparting final mold closing movement to the lever. An important advantage of this arrangement is that a smooth and rapid movement of the connection may be secured, both in closing and releasing the molds, under adequate power conditions without friction loss and without the hesitation caused where frictionally operated connections are relied upon. The quick starting of the fluid operated movement upon a slight movement of the controlling valve by the operator has been found particularly desirable and contributes largely to the operator's satisfaction in using the machine. Such fluid pressure system is, moreover, advantageous in that it is particularly well adapted for adjustment in respect to its speed and power by regulating means under the convenient control of the operator.

Figure 2:
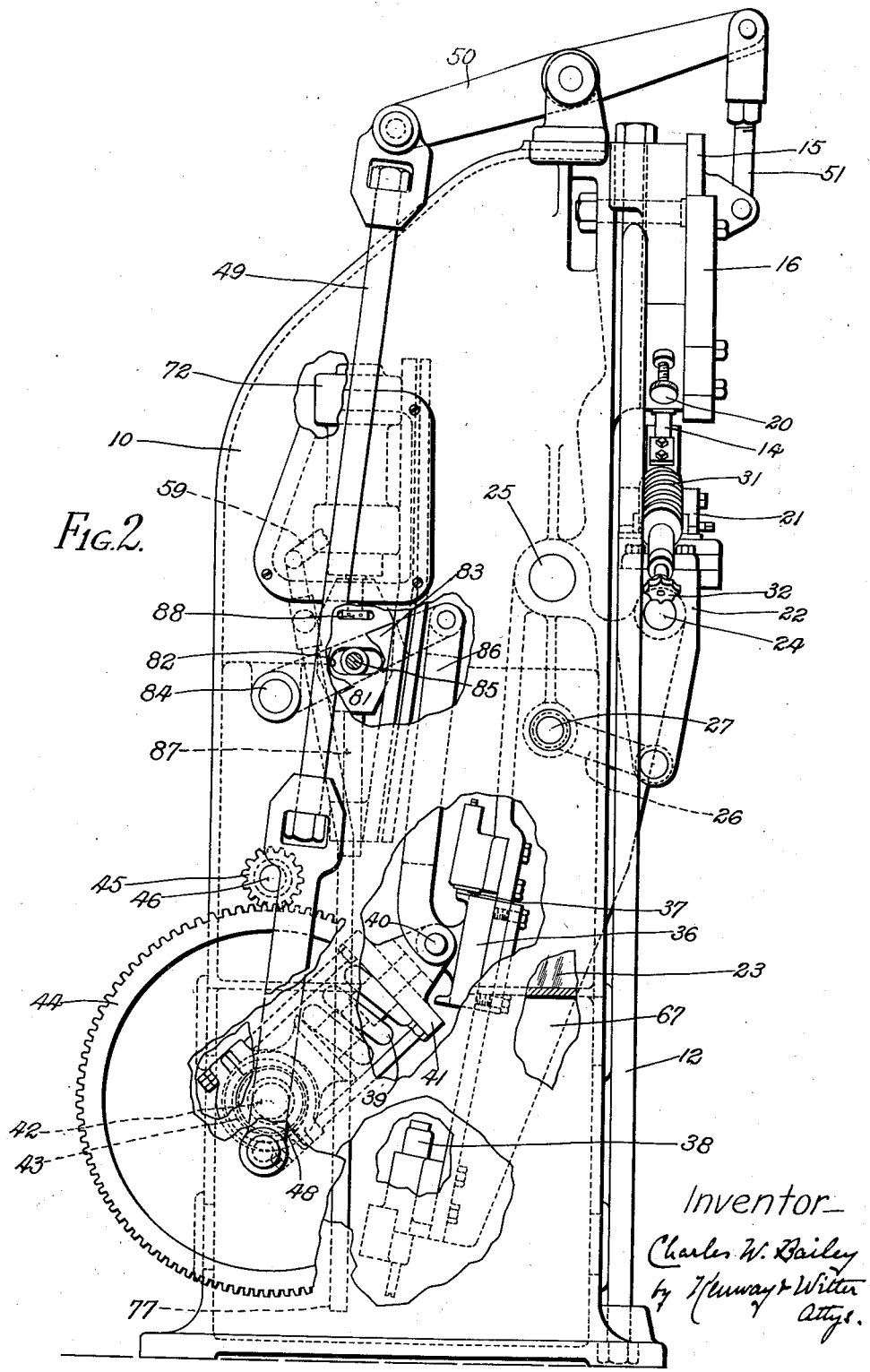
Figure 3:
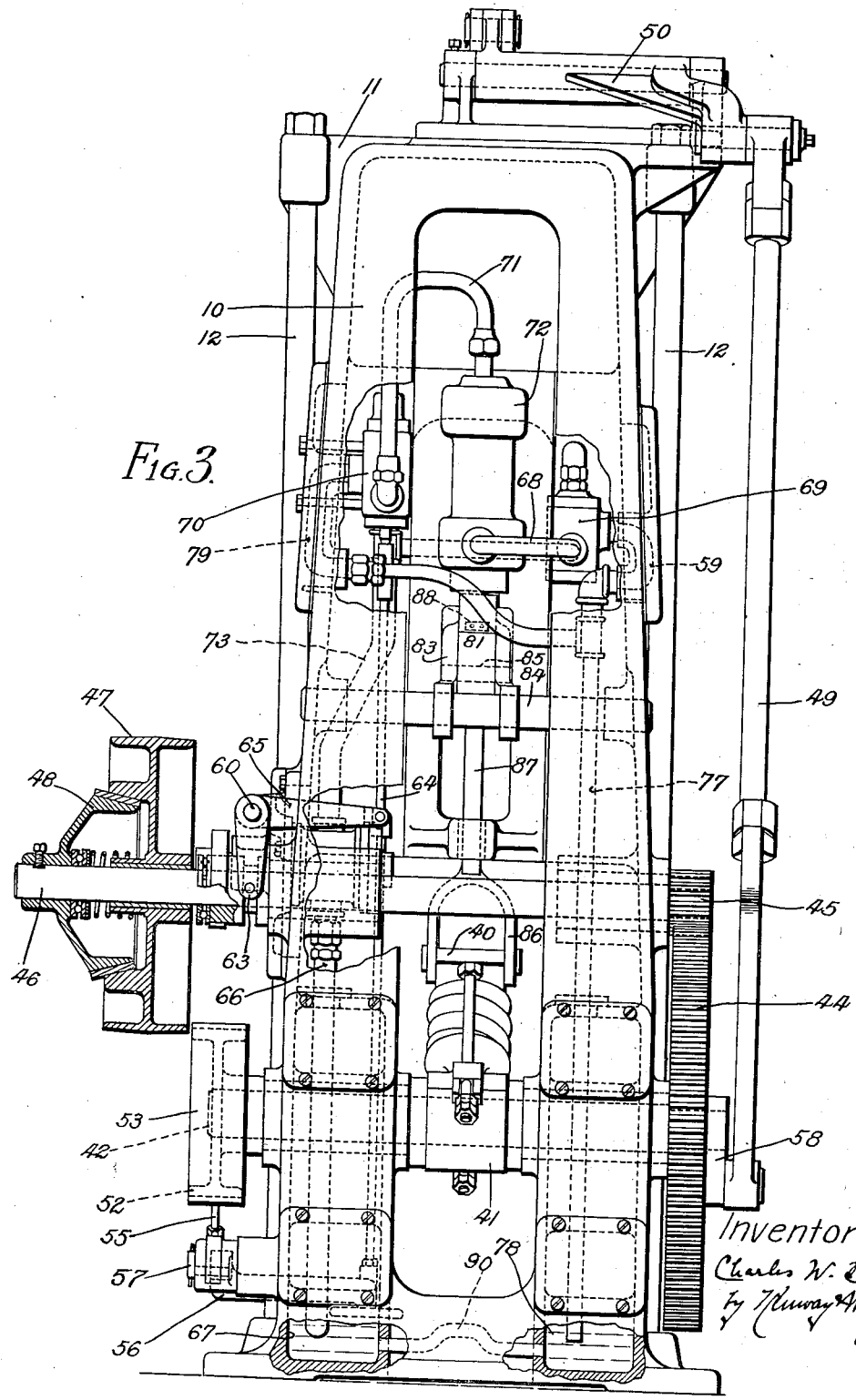
Figure 4:
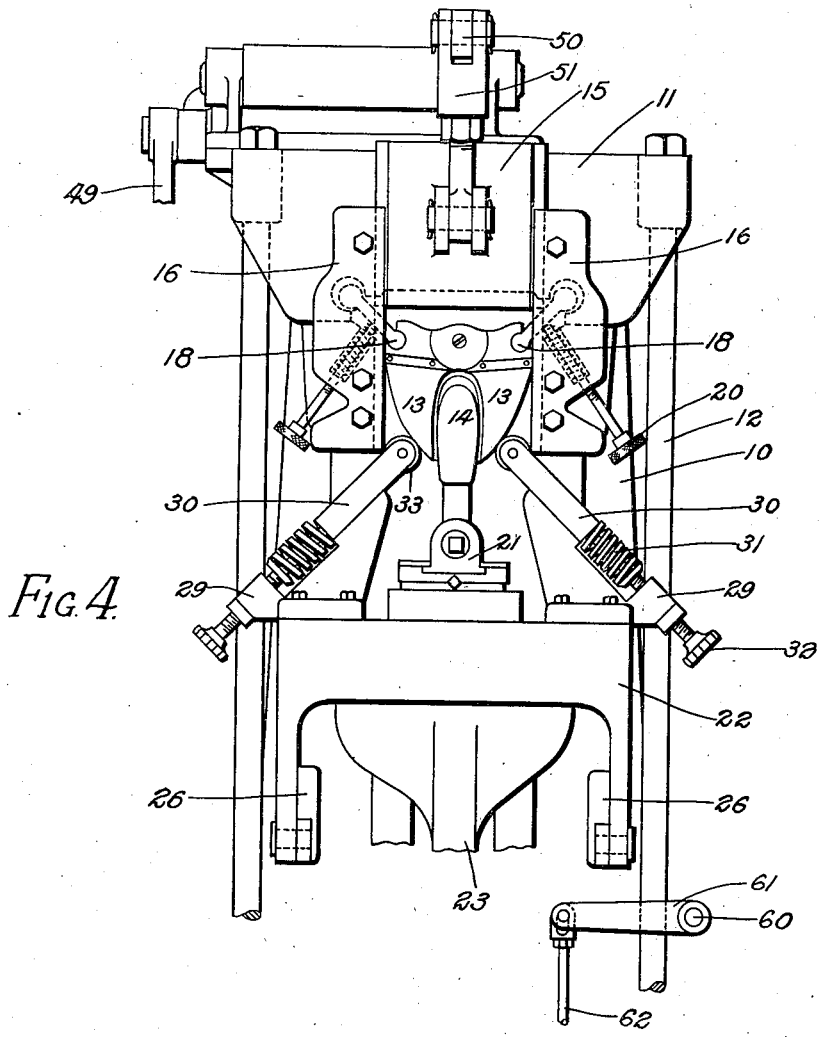
Figure 5:
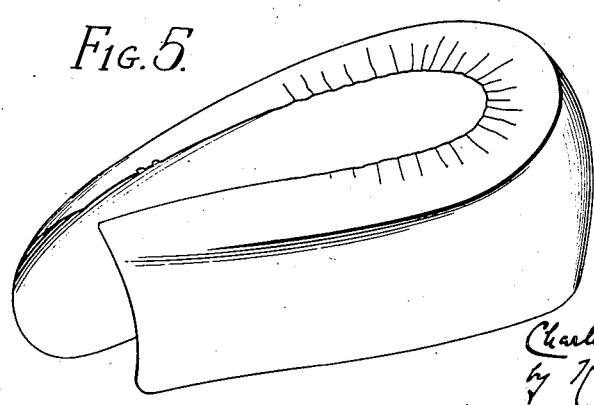

These and other important features of the invention including many novel constructional features of importance in a machine organized as a self-contained unit containing cooperating fluid pressure and mechanically operated mechanisms, will be best understood and appreciated from the following description of a preferred embodiment of the invention, selected for purposes of illustration and shown in the accompanying drawings in which, Fig. 1 is a view of the machine in elevation as seen from the right side, Fig. 2 is a corresponding view of the machine as seen from the left side, with portions of the frame broken away, Fig. 3 is a view of the machine in rear elevation, certain portions being shown in section, Fig. 4 is a view in front elevation of the upper part of the machine, Fig. 5 is a view in perspective of a molded counter produced by the machine, Fig. 6 is a diagrammatic view of the controlling valve of the hydraulic system, Fig. 7 is a view in perspective of the hydraulic system, and Fig. 8 is a view in elevation showing the pressure mechanism as seen from the left side of the machine at the conclusion of its pressure applying movement.

Before proceeding to a detailed description of the machine it will be convenient first to outline its general construction and manner of operation. A pair of concave side molds 13 is mounted in the upper part of the frame for a limited vertical movement and the individual molds are arranged to swing toward each other from open position to engage and mold the counter blank upon a male mold or plug 14. The plug 14 is carried by a vertically movable bed piece 22 mounted on the short arm of a pendent pressure lever 23. This is arranged to be rocked in two distinct steps, first to lift the plug and apply a preliminary molding pressure to the counter blank and then in a further movement to apply a final molding pressure. The lever is rocked by power through an eccentric operated link having a sliding connection with the lever. This link is first swung downwardly from its initial upwardly inclined position by fluid operated mechanism, and is then moved longitudinally by mechanical power to impart a final molding pressure to the molds. A flange plate 15 is thereupon operated to form the flange of the counter while the latter is held under molding pressure by the molds. The novel features of the present invention are found particularly in the fluid operated mechanism for controlling the action of the link and the pressure lever and in the combination of such mechanism with other elements of the machine.

In molding counters the operator inserts a curved counter blank between the molds 13 and the plug 14. He then starts the machine and the molds are at once closed in a preliminary manner, engaging the counter blank and leaving its margin projecting beyond the plane of the outer faces of the molds. The operator has an opportunity at this stage for adjusting or correcting the position of the counter blank in the molds, as by centering it if necessary before the final molding operation takes place. When the counter blank is located to his satisfaction, the further action of the machine is to bring the molds 13 together under heavy molding pressure and just before this stage is reached the flange plate 15 is reciprocated, working inwardly the projecting margin of the counter blank and molding it upon the face of the plug 14 to form the flange of the molded counter as shown, for example, in Fig. 5.

Passing now to the construction of the machine herein illustrated, it will be found to have an upright frame 10 which includes spaced side members joined by a heavy base plate. A cross girt 11 is secured to the upper portion of the frame by heavy bolts. This is tied to the base of the frame by a pair of tie rods 12 and the frame assembly is thus given adequate strength for the severe duty demanded of it. The reciprocatory flange plate 15 is arranged to travel vertically in ways 16 secured to the face of the cross girt 11. The frame is provided with bearings for a driving shaft 46, a driven shaft 43, and for a transverse shaft or journal 25 from which the main pressure lever of the machine is suspended, all as will be presently described.

The molds 13 are pivoted together and suspended in the machine between a pair of inclined toggle links 18. The links have cylindrical ends which fit into corresponding sockets formed in the cross girt 11 and in the molds 13 respectively. Each of the links 18 is engaged by the upper end of an oblique adjusting screw 20 by which the molds may be centered and properly adjusted with reference to the plug 14. When the bed piece 22 is elevated early in the cycle of the machine, the plug carries the molds 13 bodily upwardly and they are also swung inwardly by the action of the toggle links, thus bringing about the preliminary engagement of the counter blank as already described.

The plug 14 is removably supported on a base 21 which fits in ways bolted to the upper face of the bed piece 22. The bed piece 22 as shown in Figs. 2, 4 and 8 has the shape of an inverted U and is pivotally supported upon the upper end of the pressure lever 23 by a cross pin 24. Its lower arms are connected to the machine frame by links 26. These links are substantially equal in length to the distance of the cross pin 24 from the shaft 25, which constitutes the axis of the pressure lever 23, so that, in effect, the bed piece is part of a parallel linkage assembly and is guided for movement up and down in a substantially vertical path when the pressure lever 23 is rocked.

To the upper face of the bed piece 22 is bolted a pair of brackets 29 each of which carries an oblique plunger 30 backed by a heavy compression spring 31 and an adjusting screw 32. Each plunger carries at its upper end a contact piece 33 which, when the bed piece is elevated, is arranged to engage an inclined face at the lower end of one of the molds 13. In the stopped position of the machine the contact pieces 33 are spaced from the corresponding faces of the molds 13 and do not affect the preliminary closing action thereof. It is only after the bed piece 22 has been lifted sufficiently to take up this lost motion that the final molding pressure is imparted to the molds through the combined action of the toggle links 18 and the plungers 30.

The mechanism for raising and lowering the bed piece 22 will now be explained. The pressure lever 23 upon which it is carried, as already stated, is suspended from the transverse shaft 25 which extends between the sides of the frame 10. The lever is approximately triangular in shape and supports the bedpiece 22 upon the forward end of its short arm, whereas the power of the machine is applied to the lever at the lower end of its long arm. The lower portion of the lever is flanged on its rear edge to form a guideway for a slidable carriage 36 having ears in which is mounted a cross pin 40. The lever 23 is provided with a pair of spaced casings containing check stops 37 and 38 which limit the travel of the carriage 36 and cushion its movement. In the stopped position of the machine the carriage 36 is held against the upper stop 37, as shown in Fig. 2, and in position of preliminary pressure the carriage is held against the lower stop 38, as shown in Fig. 8.

Two trains of mechanism have a common point of application to the cross pin 40 and act cooperatively to impart separate movements to the carriage 36 and thereby to the pressure lever 23.

The first of these trains is mechanically actuated and includes the link 41 which is provided with projecting ears at its forward end perforated to receive the cross pin 40. At its rear end the link 41 encircles an eccentric 43 formed in the driven shaft 42, already mentioned as journaled in bearings provided in the side members of the machine frame. The link includes in its construction a heavy compression spring 39 and is arranged to yield longitudinally to a slight degree under any abnormal pressure. The shaft 42 carries at its left end a large gear 44 which meshes with a pinion 45 fast to the end of the driving shaft 46, the latter being journaled in bearings located directly above the driven shaft bearings. At its right end the shaft 46 carries a fast cone member 48 of a clutch of which the main driving pulley 47 constitutes the loose member, running freely on the shaft 46 as a journal.

On the right end of the driven shaft 42 is a brake drum 52 encircled by a brake band 53 connected to a toggle lever 54 which in turn is connected through a link of adjustable length to the rear end of the treadle 56 pivotally mounted on a transverse fulcrum stud 57. The construction is such that the brake band 53 is released when the treadle 56 is depressed to start the machine, as will be presently described, and when the treadle is released the brake band is automatically tightened on the drum 52 and the shaft 42 brought to rest.

The second train of mechanism acting through the cross pin 40 to impart movement to the carriage 36 includes the link 86 and is hydraulically actuated. This mechanism will now be described. A rotary oil pump 74 is mounted in a panel set in the right hand frame member and continuously driven by a chain 75 from a small pulley which rotates with the driving pulley 47 of the machine. The pump 74 is arranged to draw oil through a suction pipe 66 which extends downwardly from the pump into a reservoir 67 which is cast as an integral part of the right hand frame member. There is a similar reservoir 78 formed in the left hand frame member and these two reservoirs are connected by a pipe 90 as shown in the rear view of Fig. 3. The pump 74 discharges through a pipe 73 to a controlling valve 70 mounted also in the right hand frame member as shown in Figs. 1 and 3. Oil under pressure is allowed to pass at times through the valve 70 and through a pressure pipe 71 to the upper end of a hydraulic cylinder 72 which is securely mounted midway between the two side members of the frame and in a position directly above the pressure link 41.

The cylinder 72 contains a double acting piston (not shown) which has a larger effective area upon its upper face than upon its lower face. A discharge pipe 68 is connected to the lower end of the cylinder 72 and leads to a regulating valve 69. A branch discharge pipe 59 is also connected with the regulating valve 69 and this in turn is connected through suitable elbows with a vertical discharge pipe 77 which leads directly downward into the reservoir 78 above-mentioned. The controlling valve 70 also has a discharge connection through the branch pipe 79 and this has a T connection with the vertical discharge pipe 77. There is also a by-pass connection 76 between the controlling valve 69 and the pump discharge pipe 73. The cylinder 72 is provided with a piston rod 80 which projects downwardly through its lower head and which operates the train of mechanism about to be described.

The interior of the controlling valve 70 is diagrammatically shown in Fig. 6 from which it will be apparent that when the valve stem 89 is moved downwardly by its connections with the treadle rod 64 oil under pressure reaching the valve from the pipe 73 is admitted to the port supplying the pressure pipe 71. Thereupon the piston is forced downwardly in the cylinder 72 and the oil occupying the lower portion of the cylinder is forced out through the discharge pipe 68, the regulating valve 69 and the discharge pipes 59—77. On the other hand, when the valve body is moved upwardly, the port of the pipe 73 is closed and the port for the pressure pipe 71 is thrown into communication with the port for the discharge pipe 79 whereupon oil expelled from the upper end of the cylinder reaches the discharge pipe 77 by the connections already explained.

The amount of oil delivered to the cylinder 72 and its pressure may be controlled by the regulating valve 69. Oil supplied under pressure by the pump through the pressure pipe 73 is lead through the by-pass connection 76 to the regulating valve 69 and may flow therefrom directly to the branch discharge pipe 59. The setting of the regulating valve determines how much oil shall be deflected from the pump through this path. That is to say, if the regulating valve is shut down almost to the limit substantially the full pressure of the pump is delivered through the pressure pipe 71 and is directly available in the upper end of the piston and only a slight pressure is effective in an upward direction from the pipe 68 to exert a lifting tendency upon the piston. Under these circumstances the piston will be driven down rapidly with substantially the full power of the pump and returned at the end of its stroke by reason of the limited amount of oil passed by the regulating valve 69 to the connection 68. On the other hand, if the regulating valve 69 is set to permit a greater amount of oil to pass through it, the effective pressure of the pump upon the oil reaching the upper end of the cylinder 72 is correspondingly reduced and the lifting pressure of oil reaching the lower end of the cylinder is correspondingly increased.

The piston rod 80 is adjustably connected at its lower end to a head 81 which has a downwardly projecting guide rod 87 working in bearings provided in the machine frame. The position of the head 81 upon the piston rod 80 may be adjusted by turning an adjusting nut 88 which projects into slots in the sides of the head. The head is provided with a transverse slot through which projects a cross pin 85 which extends between the arms of a forked arm 83 journalled to swing upon a fulcrum shaft 84 secured in the side members of the main machine frame. The forked arm 83 is pivotally connected at its outer end to the vertical link 86 already mentioned and this is provided at its lower end with a forked head for connection with the carriage 36 through the cross pin 40 as will be apparent from an inspection of Figs. 2 and 8. The downward swinging movement of the forked arm 83 under the actuation of hydraulic pressure from the cylinder 72 is effective to move the carriage downwardly from its elevated position against the upper stop 37 to its lower position against the stop 38 and in this movement the pressure lever 23 is rocked forwardly sufficient to bring the molds 13 into position of preliminary engagement with the counter blank.

The valve stem 89 of the valve 70 is adjustably threaded in connection with the upper end of a vertical valve rod 64 and this is under treadle control, being pivotally connected to the inner end of a forked arm 65, fast to a rock shaft 60 journalled in bearings secured to the right hand frame member. The rock shaft 60 carries an arm 61 which is pivotally connected to a treadle rod 62, and this in turn is connected to the treadle 56. At its rear end the rock shaft 60 carries a forked downwardly extending arm 63 which is effective to cause engagement of the clutch members when the treadle is depressed.

From the foregoing description it will be clear that in depressing the treadle 56, the brake band 53 is first released, the valve 70 is operated to admit hydraulic pressure of the upper end of the cylinder 72, and then the main clutch is caused to engage. Upon release of the treadle the valve 70 operates to reverse the effective hydraulic pressure in the cylinder 72, the main clutch is disengaged and the brake band applied.

The wiper plate 15 is reciprocated by mechanism similar to that disclosed in my prior application. For this purpose the driven shaft 42 is provided at its end opposite to the brake drum with a crank 58. The crank 58 operates an adjustable crank rod or link 49 which is connected at its upper end to a rocker member 50 journalled in bearings secured to the top of the machine frame. At its forward end the rocker 50 is connected through the medium of another adjustable link 51 to ears which project forwardly from the wiper plate 15.

The operation of the machine described will be apparent from the foregoing description but for convenience may be summarized as follows. The operator first places a counter blank in curved position upon the male mold 14 and then depresses the treadle 56. The treadle connections are so timed that the valve 70 is first operated to admit pressure to the upper end of the cylinder 72. The piston rod 80 and head 81 are thereupon forced downwardly, the carriage 36 moved to the lower limit of its path and the pressure lever 23 rocked to elevate the mold 14 and bring the side molds 13 into position of preliminary pressure. The operator may hold the machine in this position as long as convenient and is thus given the opportunity to adjust the position of the counter blank in the molds if this is necessary. In the further depression of the treadle the brake band 53 is released and the main clutch engaged, whereupon the driven shaft 42 is rotated and the eccentric 43 acts to advance the pressure link in a substantially horizontal direction and impart further rocking movement of the pressure lever 23 thus subjecting the counter blank to the full molding pressure of the machine. As this molding pressure is exerted the wiper plate descends and the flange of the counter is wiped inwardly and molded while the body of the blank is being subjected to its molding pressure. The treadle is released, the parts of the machine return to their initial positions and the machine is brought to rest with the molds open ready for the reception of a new counter blank.

As already stated the machine is adjusted so that when the carriage 36 reaches its lowermost position as shown in Fig. 8, the molds 13 have been closed for preliminary pressure upon the counter blank. If, however, two blanks are inadvertently inserted or any other construction enters the mold space, the carriage 36 will be arrested before it reaches the position shown in Fig. 8, and consequently the molds will be relieved of an excessive and possibly destructive pressure.

While the hydraulic system above described is particularly adapted for handling oil as a fluid medium, I do not wish to be limited in that respect and contemplate employing air under some circumstances and modifying the structure of the machine to that end.

The details and mechanical devices illustrated comprise a good practical form of the invention but it is to be understood that these may be varied in form, disposition and arrangement and still be within the invention as pointed out in the following claims.

I claim:

1. A counter molding machine having, in combination, cooperating molds mounted for relative molding movement, and actuating mechanism therefor including a pressure lever, a power driven shaft, a power-transmitting connection therebetween, and fluid pressure mechanism for positioning said connection prior to its actuation by said power driven shaft.

2. A counter molding machine having, in combination, cooperating molds mounted for relative molding movement, and actuating mechanism therefor including a pressure lever, a power driven shaft, a power-transmitting connection therebetween, fluid pressure mechanism for positioning said connection, and a single controlling device for said mechanism and said shaft.

3. A counter molding machine having, in combination, cooperating molds mounted for relative molding movement, and actuating mechanism therefor including a pressure lever, a power driven shaft, a power-transmitting connection therebetween, fluid pressure mechanism for positioning said connections having a controlling valve, a clutch in said actuating mechanism, and a treadle for operating both the controlling valve and clutch.

4. A counter molding machine having, in combination, cooperating molds mounted for relative molding movement, fluid operated mechanism for imparting a preliminary closing movement to the molds under uniform pressure, and mechanically operated mechanism for thereafter imparting a further closing movement to the molds.

5. A counter molding machine having, in combination, cooperating molds mounted for relative molding movement, fluid operated mechanism for preliminarily closing the molds on a blank, mechanically operated mechanism for thereafter further closing the molds, and a controlling device for initiating the action of both said mechanisms.

6. A counter molding machine having, in combination, cooperating molds mounted for relative molding movement, fluid operated mechanism for preliminarily closing the molds on a blank, clutch controlled mechanism for thereafter further closing the molds, and a treadle arranged in its initial movement to set the fluid operated mechanism in action and in its further movement to set the clutch controlled mechanism in action.

7. A counter molding machine having, in combination, cooperating molds mounted for relative molding movement, a pressure lever for so moving the molds, power operated mechanism for swinging said lever, and fluid operated mechanism operative for preliminarily positioning said lever before the action of the power operated mechanism.

8. A counter molding machine having, in combination, cooperating molds mounted for relative molding movement, a pressure lever for so moving the molds, power operated mechanism for swinging said lever having a variable point of connection therewith, and fluid operated mechanism arranged to act at said point of connection and to swing said lever to impart a preliminary pressure to the molds before the action of the power operated mechanism.

9. A counter molding machine having, in combination, cooperating molds mounted for relative molding movement, a pressure lever for so moving the molds, power operated mechanism for swinging said lever including a thrust link arranged initially at an acute angle to said lever, and fluid operated mechanism for moving the thrust link into a substantially right angular relation to said lever preliminarily to the power operated movement of the link.

10. A counter molding machine having, in combination, cooperating molds mounted for relative molding and releasing movement, a pressure lever for so moving the molds, a thrust link for swinging said lever having a variable point of connection therewith, a hydraulic cylinder, a piston movable therein, and connections between said piston and thrust link for imparting to the link a movement greater in amplitude than the stroke of the piston.

11. A counter molding machine having, in combination, cooperating molds mounted for relative molding and releasing movement, a pressure lever journaled on a horizontal axis and movable for closing the molds, a vertically disposed fluid pressure cylinder having a piston therein, and connections for transmitting the downward movement of the piston into angular movement of the pressure lever.

12. A counter molding machine having, in combination, cooperating molds mounted for relative molding and releasing movement, a pressure lever mounted to swing about a horizontal axis for closing the molds, fluid pressure mechanism including a piston movable in a path at right angles to the axis of said lever, and connections for transmitting the reciprocatory movement of the piston into oscillatory movement of the lever.

13. A counter molding machine having, in combination, cooperating molds mounted for relative molding and releasing movement, a pressure lever mounted to swing about a horizontal axis and having a forwardly extending actuating arm and downwardly extending power arm, fluid pressure mechanism including a head guided for vertical reciprocation in a path behind said lever, a secondary lever arranged to be swung by said head, and a link operated by said secondary lever and having a sliding connection with the power arm of the pressure lever.

14. A counter molding machine having, in combination, cooperating molds mounted for relative molding and releasing movement, a power driven shaft, a fluid pump operated thereby, fluid pressure mechanism actuated by the pump and effective for closing the molds in a preliminary manner, and a mechanical train of mechanism operated by said driven shaft for imparting a final closing movement to the molds.

15. A counter molding machine having, in combination, cooperating molds mounted for molding and releasing movement, an operating member for causing such movement of the molds, and two trains of mechanism connected to said member, one being mechanically actuated by the power of the machine and the other having a fluid pressure actuating system.

16. A counter molding machine, having, in combination, cooperating molds mounted for molding and releasing movement, an operating member for causing such movement of the molds, and a fluid pressure system connected thereto and including a pump, a cylinder and piston, a controlling valve interposed between the pump and cylinder, a reservoir connected to the cylinder, and means for regulating the pressure maintained by the pump in the system.

17. A counter molding machine comprising a frame having side members each including a reservoir, counter molds movably supported by the frame, an operating lever for the molds journaled between said side members, and a hydraulic system carried by the frame and including a pump arranged to draw from one reservoir, a cylinder connected to said pump and arranged to discharge into the other reservoir, and a piston in the cylinder connected to said operating lever.

18. A counter molding machine having molds mounted for closing and opening movement, power operated mechanism for closing the molds, a hydraulic system in which pressure is maintained while the machine is in use, and a train of mechanism actuated by said pressure to effect an opening movement of the molds at the conclusion of the molding operation.

19. A counter molding machine having molds mounted for molding and releasing movements, a power driven pulley, a hydraulic system including a pump driven by said pulley to maintain fluid pressure in said system while the machine is in use, a fluid operated train of mechanism for moving said molds in both their molding and releasing movements, and a mechanically operated train of mechanism arranged to be operated by said pulley for imparting a final molding movement to the molds.

CHARLES W. BAILEY.